United States Patent [19]

Barnes

[11] Patent Number: 4,849,762
[45] Date of Patent: Jul. 18, 1989

[54] SINGLE-TRANSMISSION POLARIZATION SIGNAL EXTRACTOR

[75] Inventor: Richard M. Barnes, Acton, Mass.

[73] Assignee: Unisys Corporation, Blue Bell, Pa.

[21] Appl. No.: 560,635

[22] Filed: Dec. 12, 1983

[51] Int. Cl.⁴ ............................. G01S 7/42; G01S 7/44
[52] U.S. Cl. ...................................... 342/188; 342/192
[58] Field of Search .................. 343/55 A, 18 E, 361; 342/188, 192, 361

[56] References Cited

U.S. PATENT DOCUMENTS

| 4,005,414 | 1/1977 | Goggins, Jr. | 342/188 |
| 4,323,898 | 4/1982 | Barnes et al. | 343/362 |
| 4,472,717 | 9/1984 | Eaves et al. | 343/55 A |

FOREIGN PATENT DOCUMENTS 2083725  3/1982  United Kingdom ................ 342/188

Primary Examiner—Thomas H. Tarcza
Assistant Examiner—Gilberto Barrón, Jr.
Attorney, Agent, or Firm—Seymour Levine

[57] ABSTRACT

An apparatus and method for detecting the polarization signature of radar signals reflected from a target immersed in clutter. The signal to be transmitted is split into individual horizontal, vertical, and 45° polarized signals that are individually frequency shifted, and transmitted simultaneously. The reflected signals are processed in individual horizontal, vertical and 45° channels so as to derive Stokes vectors corresponding to each polarization and describing the scattered field associated with that polarization. The signals representing the Stokes vectors are applied to a matrix computer which provides signals representative of a Mueller matrix which describes how the transmitted signal was transformed by the target and thus constitutes the polarization signature of that target.

9 Claims, 3 Drawing Sheets

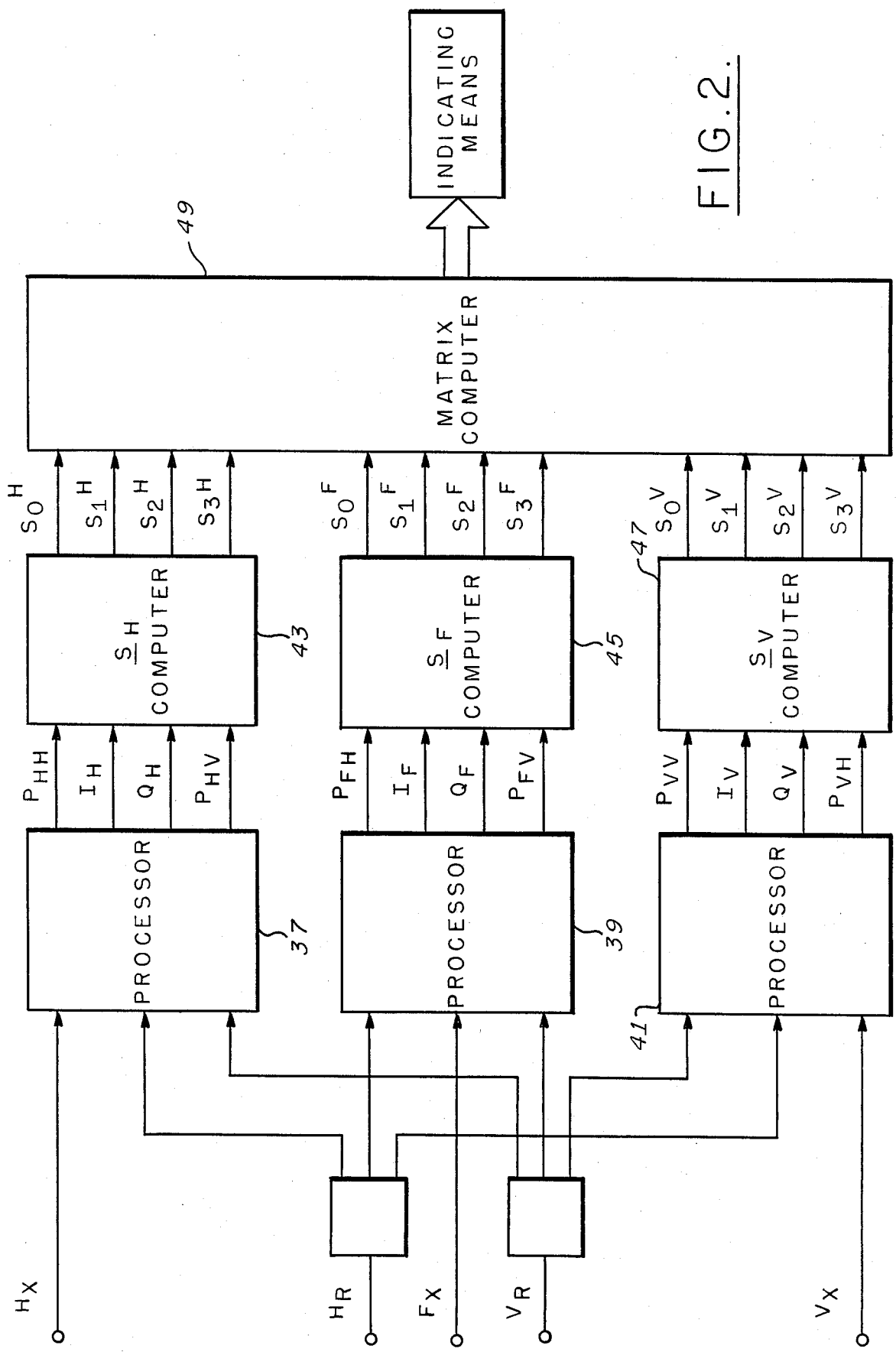

SINGLE-TRANSMISSION POLARIZATION SIGNAL EXTRACTOR

BACKGROUND OF THE INVENTION

1. Field of the Invention

The present invention relates to radar detectors and more specifically to a radar detector for detecting a target immersed in clutter.

2. Description of the Prior Art

A polarized radar signal incident upon clutter will become depolarized upon reflection so that the signal returned to the receiver will have a polarization different from that of the transmitted signal. The nature of this polarization transformation will vary with the polarization of the signal incident on the target. An approach to this problem is described in U.S. Pat. No. 4,323,898 granted to Richard M. Barnes et al and assigned to the present assignee. The returned signal is received by antennas responsive to orthogonally polarized components of the reflected signal. The received orthogonal signal components are modified and analyzed in a processor which detects the polarization of the reflected signals by estimating the Stokes parameters of the received signal which may then be used to generate detection criteria that are compared to a predetermined threshold level.

U.S. Pat. No. 4,323,899 issued to Richard M. Barnes et al and assigned to the present assignee concerns apparatus similar to that described in U.S. Pat. No. 4,323,898 but employing means to analyze the reflected signals as received by estimating the Stokes parameters of the signals and using these parameters to generate detection criteria that are compared to a predetermined threshold level. The presence of a target is indicated when the detection level criterion exceeds the threshold level.

The present invention provides means to obtain a complete polarization signature of the target, representing all possible illumination polarizations, in a single transmission. Although the aforementioned prior art devices might be modified to generate a complete polarization signature, this would require a number of sequential transmissions, which would be unsuitable if the target should move during the sequence of transmissions.

SUMMARY OF THE INVENTION

A radar target immersed in clutter is completely identified by taking all measurements required for a polarization signal simultaneously during one transmission. Three polarizations are transmitted simultaneously at three different frequencies. The return signals are separately processed in three channels to obtain signals representative of the respective Stokes vectors which are combined to provide signals representative iof all elements of the Mueller matrix which is used as a polarization signature identifying the target.

BRIEF DESCRIPTION OF THE DRAWINGS

FIG. 2 is a block diagram of signal processing circuits useful in practicing the invention.

DESCRIPTION OF THE PREFERRED EMBODIMENTS

Figure 1:
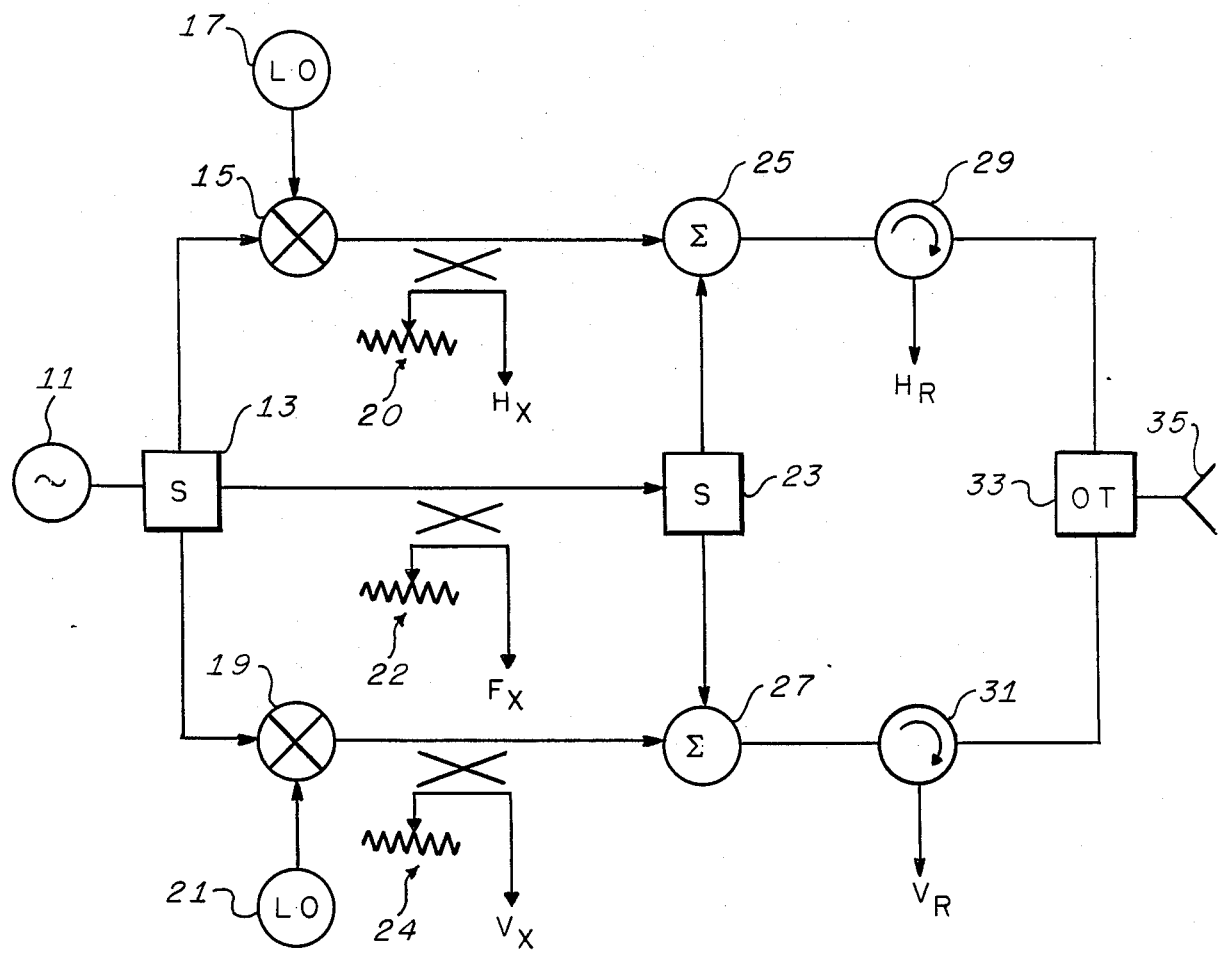
FIG. 1 is a block diagram of a transmitter-receiver useful in practicing the invention.

Referring now to FIG. 1, a transmitter-receiver that may be used for practicing the invention in a frequency modulated continuous wave (FMCW) radar system includes a FMCW source 11 which provides a conventional linear RM "chirped" signal to the system. This signal is split into three equal power components by a conventional splitter 13. The first portion of the signal which is to be transmitted with a horizontal polarization is frequency shifted in a mixer 15 by a CW local oscillator 17. The frequency of the second portion of the signal from the splitter 13, which portion is to be transmitted as a 45° linear polarization, is left unchanged. The third portion of the signal from the splitter 13 is applied to a mixer 19 where it is mixed with a signal from a second local oscillator 21. The two local oscillators are adjusted so that the frequencies of the three resultant signals are sufficiently different so that frequency-domain processing can be used to separate out the appropriate return signals. Each of the three signal branches is tapped by a conventional directional coupler to provide signals $H_X$, $F_X$, and $V_X$ representative of the horizontal, 45°, and vertical transmitted signals, respectively. The portion of the signal which is to be used for the 45° transmitted signal is applied to a second signal splitter 23 which divides this signal into two equal portions for application to conventional summers 25 and 27. The signals from the mixers 15 and 19 are added to the signals from the splitter 23 and passed through the circulators 29 and 31 respectively, to an orthomode transducer 33 and thence to a dual-polarized antenna 35 for transmission.

Dual-polarized antennas and feed systems therefore are known in the art and vary in sophistication from the simple cross dipoles discussed in "Very High Frequency Techniques" compiled by the staff of the Radio Research Laboratory, Harvard University, and published by McGraw-Hill publishing company in 1947 to circular or rectangular horns, capable of supporting both polarizations co-operating with orthomode transducers that couple horizontal and vertical polarization sensitive ports to the horn. The orthomode transducer 33 serves to couple the horizontal and vertical components of the signal between the antenna 35 and circulator 29 and the circulator 31 respectively.

Horizontal components of received signals produce $H_R$ signals at the appropriate output port of the circulator 29 and vertical components of received signal produce signals $V_R$ at the appropriate output port of circulator 31. 45° polarized signals utilize both polarization sensitive ports and both circulators.

It should be noted that the summers and signal splitters are 0° hybrids.

After reflection from the target, the return signals will have been changed in polarization, but not in frequency, except for a possible Doppler shift which will not be significant.

Signals representative of $H_X$, $F_X$, and $V_X$, the transmitted signals, at the coupled output ports of directional couplers 20, 22, and 24 of FIG. 1 are applied to the signal processing circuits 37, 39, and 41 as indicated in FIG. 2. $H_R$ and $V_R$ signals are also applied to the these processing circuits upon receipt of a reflected signal.

As indicated in FIG. 2, the aforementioned signals are applied to i.f. signal processing means comprising three Stokes vector processors 37, 39, and 41 yet to be described. The $H_R$ and $V_R$ received signals are each applied to all three processors, whereas the $H_X$, $F_X$, and $V_X$ transmitted signals are applied to individual processors.

The structures of the Stokes vector processors 37, 39, and 41 are identical. Their structure and operation can be understood by referring to FIG. 3 which illustrates the horizontal processor 37.

Figure 3:
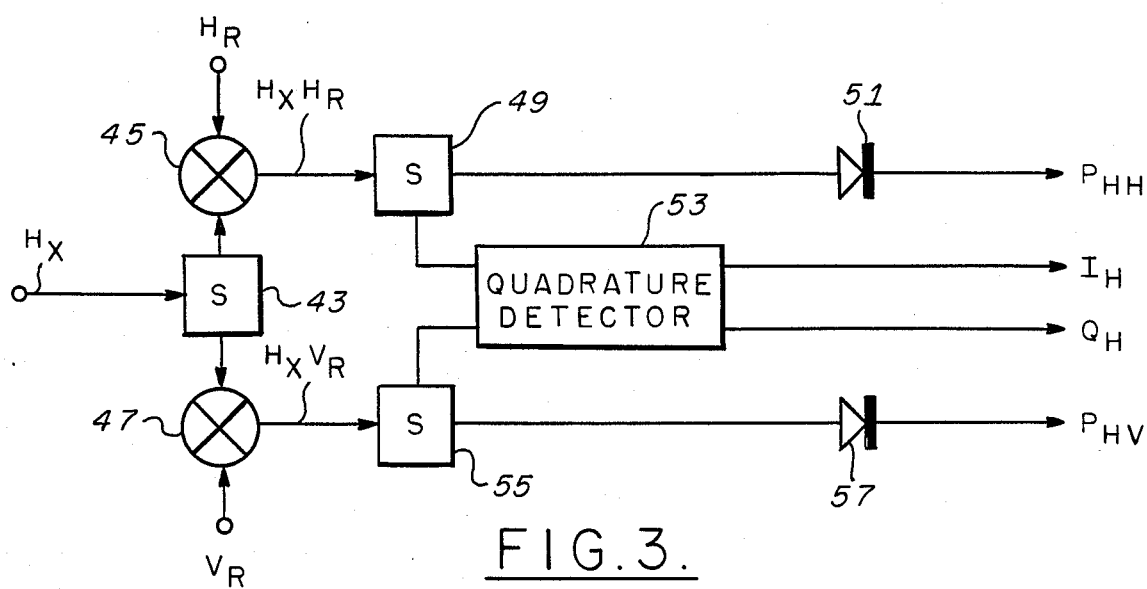
FIG. 3 is a block diagram illustrating a Stokes vector processor used in the signal processor of FIG. 2.

In the circuit of FIG. 3, the horizontal transmit reference signal is divided into two equal components by a signal splitter 43 and applied to mixers 45 and 47 which are also connected to receive the horizontal and vertical receive signals $H_R$ and $V_R$, respectively.

The output of the mixer 45 is an i.f. signal which contains information $H_X H_R$ (horizontal transmit/horizontal receive) characteristics of the target.

The signal from the mixer 45 is divided in a signal splitter 49 and coupled to a square-law diode detector 51 and a quadrature detector 53. The diode detector output represents power, $P_{HH}$.

The vertical receive signal $V_R$ is mixed with the $H_X$ signal from the signal splitter 43 to provide an $H_X V_R$ (horizontal transmit/vertical receive) i.f. signal which is divided by a signal splitter 55 and applied to a square-law diode detector 57 and to the quadrature detector 53. The output of the diode detector 57 represents power $P_{HV}$.

Quadrature detectors provide output signals proportional to components of one input signal that are in-phase and in-quadrature with a second input signal. Assuming narrow band i.f. waveforms, and representing the input signals from the signal splitters 49 and 55 as complex numbers a(t) and b(t), the outputs of the quadrature detector, i.e. the signals representing the in-phase $I_H$ and quadrature $Q_H$ relationships between the received horizontal and vertical compoents for the transmitted-horizontally polarized signal, can be represented as:

$$I_H = Re[a(t)b^*(t)]$$

$$Q_H = Im[a(t)b^*(t)]$$

where the subscript H denotes horizontal transmit and (*) denotes complex conjugate.

Assuming $H_X$ as real, $$a(t) = H_X[H_{R1} + jH_{R2}]$$

$$b(t) = H_X[V_{R1} + jV_{R2}]$$

$H_{R1}$, $V_{R1}$ being the real parts of $H_R$ and $V_R$, while $H_{R2}$, $V_{R2}$ are the imaginary parts thereof. Performing the indicated multiplication and extracting the real and imaginary parts, the in-phase and quadrature output signals for the horizontal polarization transmit are determined to be:

$$H_H = H_X^2[H_{R1}V_{R1} + H_{R2}V_{R2}]$$

$$Q_H = H_X^2[H_{R2}V_{R1} - H_{R1}V_{R2}]$$

Similar processing with respect to 45° transmit reference signals and vertical transmit reference signals is accomplished in processors 39 and 41 respectively with similar expressions for $P_{FH}$, $P_{FV}$, $I_F$, $Q_F$ and $P_{VH}$, $P_{VV}$, $I_V$, $Q_V$ obtained thereby. The various output signals from the processors are indicated in FIG. 2.

As described in aforementioned U.S. Pat. Nos. 4,323,898 and 4,323,899, incorporated herein by reference, signals of the type derived by the individual processors can be used to derive Stokes vectors.

In the present situation, the Stokes parameters corresponding to the horizontal transmit signal can be derived in accordance with the following relationships:

$$S_0^H = P_{HH} + P_{HV}$$

$$S_1^H = P_{HH} - P_{HV}$$

$$S_2^H = 2I_H$$

$$S_3^H = 2Q_H$$

Specifically, in the present situation, these particular arithmetic computations are carried out in computer 43 as depicted in FIG. 2. Analogous computations with respect to $F_X$ and $V_X$ are carried out in computers 45 and 47 to provide signals representative of the respective Stokes parameters.

The output signals from the computer 43 can be considered a Stokes vector $\underline{S}_H = (S_0^H, S_1^H, S_2^H, S_3^H)^T$ where the superscript T denotes transposition. Similarly computers 45 and 47 calculate Stokes vectors $S_F$ and $S_V$ respectively describing scattered fields for 45° linear transmission and vertical transmission.

The twelve ouput signals from these computers define the three Stokes vectors resulting from the three transmitted signals. These twelve signals are processed in a matrix computer 49 to determine the target's Mueller matrix or "polarization signature" as will be explained.

The concept of a Mueller matrix is used in statistical optics to describe how a transmitted Stokes vector $\underline{S}_X$ is transformed by a reflector to a scattered Stokes vector $\underline{S}_S$: $\underline{S}_S = M\underline{S}_X$, where M is the Mueller matrix. Such a process is described, for instance in E. L. O'Neill, *Introduction to Statistical Optics*, Addison Wesley Publishing Company, 1963. The present invention utilizes these principles in a radar environment.

The Stokes vectors $\underline{S}_X$ for horizontal, vertical, and 45° linear transmit polarizatiions are $(1\ 1\ 0\ 0)^T$ $(1-1\ 0\ 0)^T$, and $(1\ 0\ 1\ 0)^T$, respectively.

The Mueller matrix is a 4×4 real symmetric matrix, therefore the matrix may be represented as:

$$M = \begin{bmatrix} m_{11} & \cdots & m_{14} \\ & \cdots & \\ & \cdots & \\ m_{14} & \cdots & m_{44} \end{bmatrix}$$

It will be recalled that $\underline{S}_S = M\underline{S}_X$. In each case, the horizontal, vertical, and 45° scattered Stokes vectors are equal to the product of the Mueller matrix, M, and the transmitted horizontal, vertical, and 45° transmitted vectors, respectively. Therefore, $$\begin{bmatrix} S_0^H \\ S_1^H \\ S_2^H \\ S_3^H \end{bmatrix} = \begin{bmatrix} m_{11} & m_{12} & m_{13} & m_{14} \\ m_{12} & m_{22} & m_{23} & m_{24} \\ m_{13} & m_{23} & m_{33} & m_{34} \\ m_{14} & m_{24} & m_{34} & m_{44} \end{bmatrix} \begin{bmatrix} 1 \\ 1 \\ 0 \\ 0 \end{bmatrix}$$

-continued $$\begin{bmatrix} S_0^V \\ S_1^V \\ S_2^V \\ S_3^V \end{bmatrix} = \begin{bmatrix} m_{11} & m_{12} & m_{13} & m_{14} \\ m_{12} & m_{22} & m_{23} & m_{24} \\ m_{13} & m_{23} & m_{33} & m_{34} \\ m_{14} & m_{24} & m_{34} & m_{44} \end{bmatrix} \begin{bmatrix} 1 \\ -1 \\ 0 \\ 0 \end{bmatrix}$$

$$\begin{bmatrix} S_0^F \\ S_1^F \\ S_2^F \\ S_3^F \end{bmatrix} = \begin{bmatrix} m_{11} & m_{12} & m_{13} & m_{14} \\ m_{12} & m_{22} & m_{23} & m_{24} \\ m_{13} & m_{23} & m_{33} & m_{34} \\ m_{14} & m_{24} & m_{34} & m_{44} \end{bmatrix} \begin{bmatrix} 1 \\ 0 \\ 1 \\ 0 \end{bmatrix}$$

Since the matrix is symmetric, the 16 elements comprising the matrix contain ten unknowns, but only nine of these are independent since:

$$m_{44} = m_{11} - m_{22} - m_{33}$$

From the above it is evident that the following relationships between scattered Stokes vectors and the various Mueller matrix elements exist:

$$S_0^H = m_{11} + m_{12}S_0^V = m_{11} - m_{12}S_0^F = m_{11} + m_{13}$$
$$S_1^H = m_{12} + m_{22}S_1^V = m_{12} - m_{22}S_1^F = m_{12} + m_{23}$$
$$S_2^H = m_{13} + m_{23}S_2^V = m_{13} - m_{23}S_2^F = m_{13} + m_{33}$$
$$S_3^H = m_{14} + m_{24}S_3^V = m_{14} - m_{24}S_3^F = m_{14} + m_{34}$$

The signals representing these scattered vectors are supplied by the Stokes vector computers 43, 45, and 47 to the Mueller matrix computer 49 which performs the following straight forward computations to arrive at values representing the matrix elements:

$$m_{11} = \frac{S_0^H + S_0^V}{2} \quad m_{14} = \frac{S_3^H + S_3^V}{2}$$

$$m_{12} = \frac{S_0^H - S_0^V}{2} = \frac{S_1^H + S_1^V}{2} \quad m_{24} = \frac{S_3^H - S_3^V}{2}$$

$$m_{22} = \frac{S_1^H - S_1^V}{2} \quad m_{33} = S_2^F - \frac{S_2^H + S_2^V}{2}$$

$$m_{13} = \frac{S_2^H + S_2^V}{2} \quad m_{34} = S_3^F - \frac{S_3^H + S_3^V}{2}$$

$$m_{23} = \frac{S_2^H - S_2^V}{2}$$

$$m_{44} = \frac{S_0^H - S_1^H + S_2^H + S_0^V + S_1^V + S_2^V}{2} - S_2^F$$

Thus the output of the Mueller matrix computer includes all signals to form the desired polarization signature.

The output signals from the matrix computer 49 can be used to actuate any desired indicating means.

The foregoing description concerns an FMCW system.

It will be appreciated by those skilled in the art that the principles of the invention are applicable to radar systems employing other transmission modes.

Figure 4:
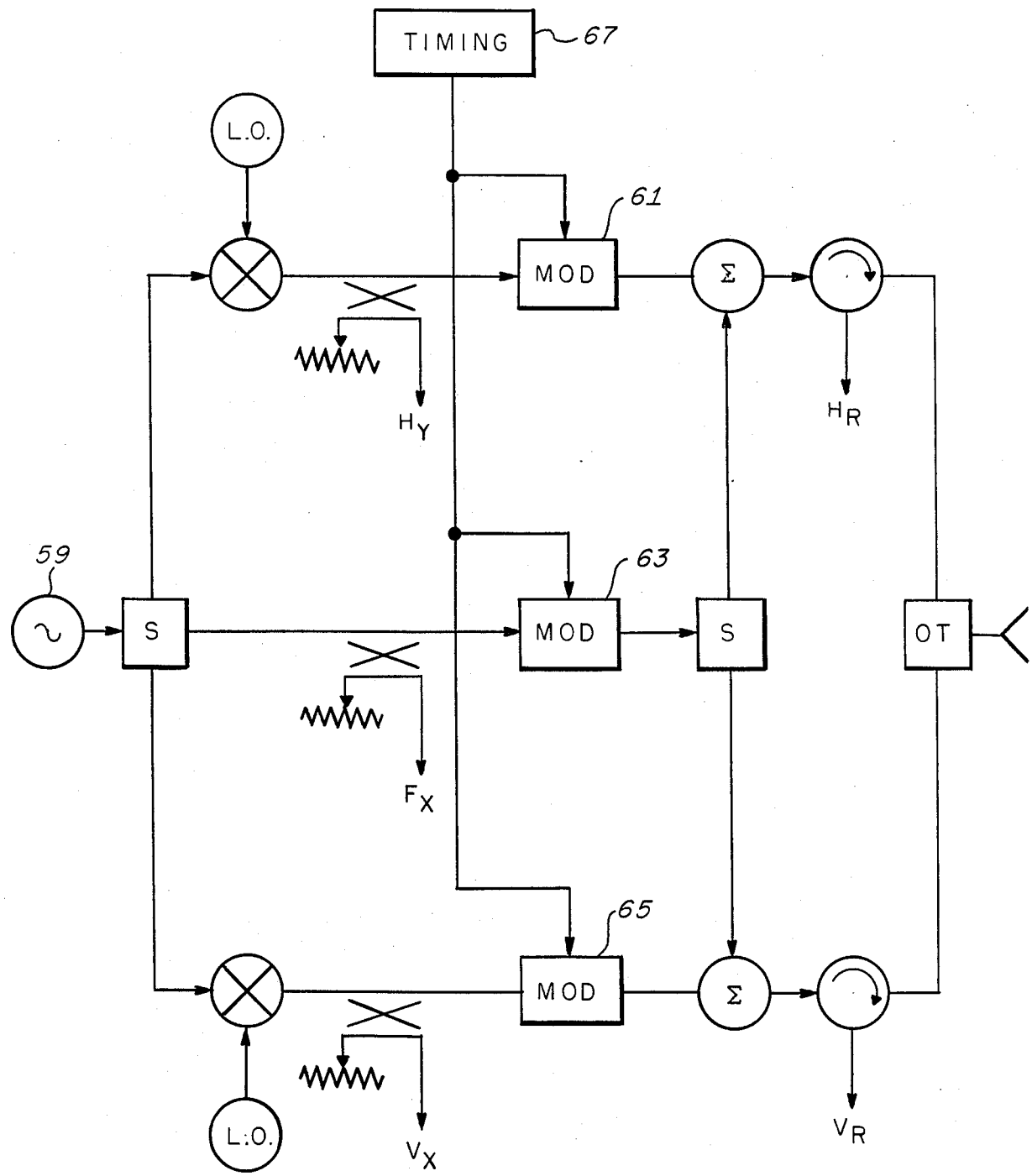
FIG. 4 is a block diagram of an alternate form of transmitter-receiver.

The invention may be used in pulse radar systems, for example, by modifying the transmitter-receiver circuit as indicated in FIG. 4.

The transmitter-receiver of FIG. 4 is identical to that depicted in FIG. 1, except that a stepped frequency source 59 has been substituted for the FMCW source 11 of FIG. 1 and modulators 61, 63, and 65 have been inserted in the three transmission signal channels. The modulators are actuated by a timing source 67. The transmitter-receiver of FIG. 2 provides output signals $H_X$, $F_X$, and $V_X$, as well as $H_R$ and $V_R$ in a fashion identical to those provided by the transmitter-receiver of FIG. 1. These signals are applied to processing circuits identical to those depicted in FIGS. 2 and 3.

In operation the three modulators are actuated by the timer 67 so as to simultaneously switch on signals corresponding to all three transmit polarizations to permit polarization signature measurement in the signal processing circuit of FIG. 2. The use of a stepped frequency CW source permits several frequency-diverse looks at a target on successive pulses.

It will be understood that the foregoing references to vertical and horizontal components and directions are not absolute, but are used for convenience and are merely intended to describe relative orientations.

While the invention has been described in its preferred embodiments, it is to be understood that the words which have been used are words of description rather than limitation and that changes within the purview of the appended claims may be made without departure from the true scope and spirit of the invention in its broader aspects.

I claim:

1. An apparatus for determining polarization signatures of radar targets comprising:
    means for providing a source signal;
    means coupled to said source signal means for converting said source signal into a plurality of signals each having a unique frequency;
    antenna means having a plurality of polarizations coupled to said converting means for transmitting signals at a polarization unique to each signal at each unique frequency and for receiving signals at selected polarizations within said plurality of polarizations;
    means for sampling each transmitted signal to provide a transmitted representative signal for each transmitted signal;
    processing means responsive to said transmitted representative signals and to signals received at said selected polarizations for providing signals representative of a Stokes Vector for echo returns of each of said transmitted signals; and
    matrix computer means for processing said signals representative of Stokes Vectors to provide signals representative of elements in a Mueller Matrix, thereby establishing a complete polarization signature for a radar target causing said echo returns.

2. An apparatus in accordance with claim 1 wherein said converting means converts said source signal into three signals each having a unique frequency.

3. An apparatus in accordance with claim 2 wherein said antenna means is responsive to horizontal and vertical polarizations and said unique polarizations are horizontal, vertical, and 45 degrees, said 45 degrees polarization provided by splitting one of said three signals converted from said source into two equal signals and coupling one of said two equal signals to a horizontal input of said antenna means and one of said two equal signals other than said one to a vertical polarization input of said antenna means.

4. An apparatus in accordance with claim 3 wherein said processing means includes first, second, and third procesors each coupled to receive a unique one signal of said transmitted representative signals and each coupled to receive horizontal and vertical polarized signals received by said antenna means, each processor constructed and arranged for providing signals required for determining Stokes parameters from received signals corresponding to said unique one signal coupled thereto.

5. The apparatus of claim 4 wherein each processor includes:

first signal splitting means for equally dividing transmitted representative signals could thereto into two representative signals;

means coupled to receive a first signal of said two representative signals and coupled to horizontal and vertical polarization terminals of said antenna means for combining said one signal with received horizontal polarized signals to obtain a first combined signal and for combining a second signal of said two representative signals with received vertical polarized signals to obtain a second combined signal;

second signal splitting means for equally dividing said first and second combined signals to obtain first and second vertically polarized combined representative signals, and first and second horizontally combined representative signals;

means coupled to receive said first horizontally combined representative signal and said first vertically combined representative signal to obtain in-phase and quadrature component representative signals of said first combined representative signal relative to said second combined representative signal; and means coupled to receive said second horizontally combined representative signal and said second vertically combined representative signal for providing signal power representative signals for said first and second combined signals.

6. An apparatus for determining polarization signatures of radar targets comprising:

means for providing a plurality of signals each having a unique frequency and a unique polarization;

means for transmitting said plurality of signals and for receiving echoes of transmitted signals from a target;

means coupled to receive said echoes and samples of said transmitted signals for providing signals representative of a Stokes polarization vector for each transmitted signal; and means coupled to receive said signals representative of Stokes polarization vectors for providing signals representative of elements of a Mueller Matrix thereby establishing a complete polarization signature for said target.

7. A method for obtaining a complete polarization signature of a radar target comprising the steps of:

providing a source signal at a predetermined frequency;

dividing said source signal into three equal signals;

converting said three equal signals to establish three converted signals each having a unique frequency;

transmitting each of said three converted signals with a unique polarization for each of said three converted signals;

sampling each transmitted signal to obtain transmitted signal samples;

receiving two polarization components of target echoes resulting from each transmitted signal;

processing signals received at each of said two polarization components with said transmitted signal samples to obtain signal representative of a Stokes Vector for echo returns of each of said transmitted three converted signals; and processing said signals representative of Stokes Vectors to obtain signals representative of elements of a Mueller Matrix for said radar target, thereby establishing a complete polarization signature.

8. The method of claim 7 wherein the step of processing signals to obtain Stokes vectors includes processing said signals received at each of said two polarizatiion components to obtain signals representative of signal power in each of said two polarization components and to obtain in-phase and quadrature signal components of one of said two polarization components relative a polarization component of said two polarization components other than said one.

9. The method of claim 7 wherein unique polarizations for each of said three converted signals transmitted are horizontal, vertical, and 45 degrees and said two polarization components are horizontal and vertical.

* * * * *